(12) United States Patent
Park

(10) Patent No.: US 8,169,571 B2
(45) Date of Patent: May 1, 2012

(54) TRANSFLECTIVE LCD DEVICE AND METHOD WITH A JUMPING ELECTRODE FORMED OF THE SAME MATERIAL AS A REFLECTIVE ELECTRODE

(75) Inventor: Byung Ho Park, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 690 days.

(21) Appl. No.: 11/311,687

(22) Filed: Dec. 20, 2005

(65) Prior Publication Data

US 2007/0002223 A1 Jan. 4, 2007

(30) Foreign Application Priority Data

Jun. 29, 2005 (KR) .................. 10-2005-0057252

(51) Int. Cl.
*G02F 1/1335* (2006.01)
*G02F 1/1345* (2006.01)
(52) U.S. Cl. ......... 349/114; 349/113; 349/149; 349/152
(58) Field of Classification Search .......... 349/113–114, 349/149–152
See application file for complete search history.

(56) References Cited

U.S. PATENT DOCUMENTS

| | | | | |
|---|---|---|---|---|
| 5,408,345 | A | * | 4/1995 | Mitsui et al. .................... 349/42 |
| 5,907,379 | A | * | 5/1999 | Kim et al. ...................... 349/141 |
| 6,049,365 | A | * | 4/2000 | Nakashima ..................... 349/42 |
| 6,522,377 | B2 | * | 2/2003 | Kim et al. ....................... 349/114 |
| 6,831,718 | B2 | * | 12/2004 | Wei et al. ...................... 349/114 |
| 6,980,270 | B2 | * | 12/2005 | Tsuda et al. ................... 349/114 |
| 2002/0113934 | A1 | * | 8/2002 | Aoki .............................. 349/149 |
| 2003/0086036 | A1 | * | 5/2003 | Yang et al. ..................... 349/113 |
| 2004/0021813 | A1 | * | 2/2004 | Kim et al. ...................... 349/113 |
| 2004/0109102 | A1 | * | 6/2004 | Chang et al. ................... 349/44 |
| 2004/0207784 | A1 | * | 10/2004 | Lim et al. ...................... 349/114 |
| 2005/0057704 | A1 | * | 3/2005 | Ootake et al. .................. 349/69 |
| 2005/0077523 | A1 | * | 4/2005 | Ahn et al. ....................... 257/72 |

FOREIGN PATENT DOCUMENTS

| | | |
|---|---|---|
| CN | 1538227 | 10/2004 |
| CN | 1610110 | 4/2005 |
| JP | 2001-042355 | 2/2001 |
| JP | 2002-006773 | 1/2002 |
| JP | 2004-070355 | 3/2004 |
| KR | 10-2004-0012445 | 2/2004 |

* cited by examiner

*Primary Examiner* — Jessica M Merlin
(74) *Attorney, Agent, or Firm* — McKenna, Long, and Aldridge, LLP.

(57) ABSTRACT

A transflective type LCD including: a substrate in which a pixel region having a reflection region and a transmission region are defined; a gate line and a data line crossing each other on the substrate to define the pixel region; a TFT (thin film transistor) formed at the crossing of the gate line and the data line; a transparent electrode formed in the pixel region and connected to a drain electrode of the TFT; a storage electrode formed on the gate line; a reflective electrode formed in the reflection region; and an insulation layer with a protrusion pattern formed in the reflection region, wherein the insulation layer in the reflection region is in between the transparent electrode and the reflective electrode.

20 Claims, 6 Drawing Sheets

TRANSFLECTIVE LCD DEVICE AND METHOD WITH A JUMPING ELECTRODE FORMED OF THE SAME MATERIAL AS A REFLECTIVE ELECTRODE

This application claims the benefit of Korea Patent Application No. 057252/2005, filed on Jun. 29, 2005, which is hereby incorporated by reference for all purposes as if fully set forth herein.

BACKGROUND OF THE INVENTION

1. Field of the Invention

The present invention relates to a liquid crystal display device, and more particularly, to a transflective type liquid crystal display device operable in a reflection mode and a transmission mode, and a method of manufacturing the same.

2. Discussion of the Related Art

Liquid crystal display devices (LCDs) may be classified into a transmission type LCD and a reflection type LCD. While the transmission type LCD uses a backlight unit as a light source, the reflection type LCD uses an external light (e.g., natural light, artificial light) as a light source, instead of light emitted from the backlight unit.

Due to the use of the backlight unit, the transmission type LCD may display an image even in a dark external environment. However, the transmission type LCD has a drawback of high power consumption.

On the contrary, because the reflection type LCD does not use the backlight unit, it has low power consumption but cannot be used in a place where no external light exists (for example, at night).

To overcome these limitations, a transflective type LCD has been developed.

Because the transflective type LCD has both a reflection region and a transmission region within a unit pixel region, it can perform functions of the transmission type LCD and the reflection type LCD at the same time. Accordingly, because the transflective type LCD may use the light emitted from the backlight unit and the external light, it is not affected by the environment and can reduce power consumption.

FIG. 1 is an exploded perspective view of a related art transflective type LCD, and FIG. 2 is a sectional view of the related art transflective type LCD illustrated in FIG. 1. Referring to FIGS. 1 and 2, the related art transflective type LCD 11 includes a top substrate 15, a bottom substrate 21, liquid crystals 14, and a backlight unit 41. The top substrate 11 includes a black matrix 16, sub color filters 17, and transparent common electrodes 13. The bottom substrate 21 includes switching elements T and array lines 25 and 39 formed in a pixel region P. The liquid crystals 14 are injected between the top substrate 15 and the bottom substrate 21. The backlight unit 41 is disposed under the bottom substrate 21.

The pixel region P has a transmission region B and a reflection region D. The transmission region B and the reflection region D are defined by a reflective electrode 49 and a transparent electrode 61. The transmission region B has a transmission hole A in which the reflective electrode 49 is not present. The reflective electrode 49 exists in the reflection region D.

An operation of the related art transflective type LCD in the reflection mode and in the transmission mode will be described below.

In the reflection mode, external light is used as the light source. In this case, light F2 incident on the top substrate 15 is reflected from the reflective electrode 49 and passes through liquid crystals 14 arranged according to an electric field between the reflective electrode 49 and the common electrode 13. The amount of the light F2 passing through the liquid crystals 14 is adjusted according to the arrangement of the liquid crystals 14 and thereby an image is displayed.

In the transmission mode, the backlight unit 41 disposed under the bottom substrate 21 is used as the light source. Light F1 emitted from the backlight unit 41 is incident on the liquid crystals 14 through the transparent electrode 61 and the transmission hole A. Then, the light F1 passes through the liquid crystals 14 arranged according to an electric field between the transparent electrode 61 and the common electrode 13. An amount of the light F1 passing through the liquid crystals 14 is adjusted according to the arrangement of the liquid crystals 14 and thereby an image is displayed.

FIG. 3 is an enlarged plan view of a portion of the bottom substrate in the related art transflective type LCD.

The bottom substrate 21 is also called an array substrate. The bottom substrate 21 includes a plurality of gate lines 25, a plurality of data lines 39, and thin film transistors (TFTs) T. The gate lines 25 and the data lines 39 cross one another. The TFTs T acting as switching elements are provided at crossings of the gate lines 25 and the data lines 39. Pixel regions P are defined by the crossing of the gate lines 25 and the data lines 39.

A gate pad electrode 27 is formed at one end of the gate line 25 and has a larger width than that of the gate line 25.

A data pad electrode 41 is formed at one end of the data line 39 and has a larger width than that of the data line 39.

The gate pad electrode 27 and the data pad electrode 41 electrically contact with a transparent gate pad terminal electrode 63 and a transparent data pad terminal electrode 65, respectively. The transparent data pad terminal electrode 63 and the transparent data pad terminal electrode 65 directly receive corresponding external signals.

A storage capacitor C is formed on a portion of the gate line 25.

The TFT T includes a gate electrode 23, source/drain electrodes 35 and 37, and an active layer 31 formed on the gate electrode 23.

A transparent electrode 61 and a reflective electrode 49 with a transmission hole A are formed in the pixel region P. The transparent electrode 61 and the reflective electrode 49 define a transmission region B and a reflection region D.

The storage capacitor C includes a first capacitor electrode and a second capacitor electrode. A portion of the gate line 25 is used as the first capacitor electrode 43. A metal layer 43 facing a portion of the gate line 25 and formed on an equal layer to the drain electrode 37 is used as the second capacitor electrode.

The metal layer 43 may be connected to the transparent electrode 61 through a contact hole 55, or may be formed in the drain electrode 37 by extending above the gate line 25 through a lower portion of the reflective electrode 49. In this case, the contact hole 55 is not required.

FIG. 4 is a sectional view taken along lines II-II', III-III' and IV-IV' of FIG. 3 in the bottom substrate of the related art transflective type LCD.

Referring to FIG. 4, a gate electrode 23, a gate line 25, and a gate pad electrode 27 are formed on a substrate 21. The gate pad electrode 27 is connected to one end of the gate line 25.

A gate insulation layer 29 as a first insulation layer is formed on the substrate 21 where the gate electrode 23 and the gate line 25 are formed.

An active layer 31 and an ohmic contact layer 33 are formed in an island shape on the gate insulation layer 29 disposed on the gate electrode 23.

Source/drain electrodes 35 and 37 contacting the ohmic contact layer 33, a data line 39 connected to the source electrode 35, and a data pad electrode 41 connected to one end of the data line 39 are formed on the substrate 21 where the ohmic contact layer 33 is formed.

At the same time, an island-shaped metal layer 43 is formed on a portion of the gate line 25.

A protection layer 45 as a second insulation layer is formed on the substrate 21 where the data line 39 is formed.

The protection layer 45 is an inorganic insulation layer formed by depositing silicon nitride (SiNx) or silicon oxide (SiO2).

An organic insulation layer 47 is coated on the protection layer 45 to form a third insulation layer. The organic insulation layer 47 may be selected from the transparent organic insulation material group including benzo-cyclo-butene (BCB) and acryl-based resin.

A protrusion pattern 47b is formed in the reflection region D of the organic insulation layer 47.

The gate insulation layer 29, the protection layer 45, and the organic insulation layer 47 are etched to form an etch groove 48 in a portion of the pixel region P.

The etch groove 48 is a portion corresponding to the transmission hole of the reflective electrode that will be formed later.

Meanwhile, the protection layer 45 and the organic insulation layer 47 that dare disposed above the drain electrode 37, the metal layer 43, and the protection layer 45, and the gate insulation layer 29, the protection layer 45 and the organic insulation layer 47 that are disposed above the gate pad electrode 27, are etched to form a drain contact hole 53 exposing a portion of the drain electrode 37, a storage contact hole 55 exposing a portion of the metal layer 43, a gate pad contact hole 57 exposing a portion of the gate pad electrode 27, and a data pad contact hole 59 exposing a portion of the data pad electrode 41.

A transparent conductive metal including indium tin oxide (ITO) and indium zinc oxide (IZO) is deposited on the substrate 21 where the plurality of contact holes, 53, 55, 57, and 59 are formed and is patterned to form a transparent electrode 61 constituting the pixel region P while contacting the drain electrode 37 and the metal layer 43 at the same time, a gate pad terminal electrode 63 contacting the gate pad electrode 27, and a data pad terminal electrode 65 contacting the data pad electrode 41.

The transparent electrode 61 is also formed in a protrusion structure along the protrusion pattern 47b of the organic insulation layer 47 in the reflection region D.

A metal, such as aluminum or aluminum alloy, having an excellent reflectivity is deposited on the substrate 21 where the transparent electrode 61 is formed, and is patterned to form a reflective electrode 49 with a transmission hole A corresponding to the etch groove 48. The reflective electrode 49 is not formed at the bottom of the transmission hole A.

The reflective electrode 49 is formed along the organic insulation layer 47 and the transparent electrode 61 in the reflection region D to have protrusions corresponding to the protrusions in the organic insulation layer 47.

The bottom substrate of the related art transflective type LCD may be manufactured using the above-described method.

However, when the etching process is carried out for forming the reflective electrode 49 on the bottom substrate, the etching solution may penetrate the transparent electrode 61, the gate pad terminal electrode 63, and the data pad terminal electrode 65, resulting in defects.

In addition, due to the protrusion pattern 47b formed in the reflection region D, a problem of adhesion failure between the protrusion pattern-47b and the transparent electrode 61 is caused.

Further, when the gate insulation layer 29, the protection layer 45, and the organic insulation layer 47 are etched to form the transmission hole A, these layers may be over-etching the substrate 21. Therefore, when the transparent electrode 61 is formed in the transmission hole A, a problem occurs in that the transparent electrode 61 is badly deposited.

SUMMARY OF THE INVENTION

Accordingly, the present invention is directed to a transflective type LCD and a method of manufacturing the same that substantially obviate one or more problems due to limitations and disadvantages of the related art.

An advantage of the present invention is to provide a transflective type LCD capable of reducing the number of mask processes by forming a transparent electrode earlier than a protection layer and protrusions and capable of preventing various kinds of failure.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a transflective type LCD including: a substrate in which a pixel region having a reflection region and a transmission region are defined; a gate line and a data line crossing each other on the substrate to define the pixel region; a TFT (thin film transistor) formed at the crossing of the gate line and the data line; a transparent electrode formed in the pixel region and connected to a drain electrode of the TFT; a storage electrode formed on the gate line; a reflective electrode formed in the reflection region; and an insulation layer with a protrusion pattern formed in the reflection region, wherein the insulation layer in the reflection region is in between the transparent electrode and the reflective electrode.

In another aspect of the present invention, there is provided a method of manufacturing a transflective type LCD, including: providing a substrate in which a pixel region having a reflection region and a transmission region are defined; forming a gate line and a gate electrode on the substrate; forming a first insulation layer on the substrate on which the gate line is formed; forming a semiconductor layer on the first insulation layer disposed on the gate electrode, source/drain electrodes contacting with the semiconductor layer, a data line connected to the source electrode and crossing the gate line, a storage electrode on the gate line, and first and second pad electrodes at one end of the gate line and one end of the data line, respectively; forming a transparent electrode on the first insulation layer between the drain electrode and the storage electrode, and first and second pad terminal electrodes electrically connected to the first and second pad electrodes, respectively; forming a second insulation layer in the reflection region; forming a third insulation layer with a protrusion pattern on the second insulation layer of the reflection region; and forming a reflective electrode in the reflection region, and a jumping electrode connecting the gate line to the first pad electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
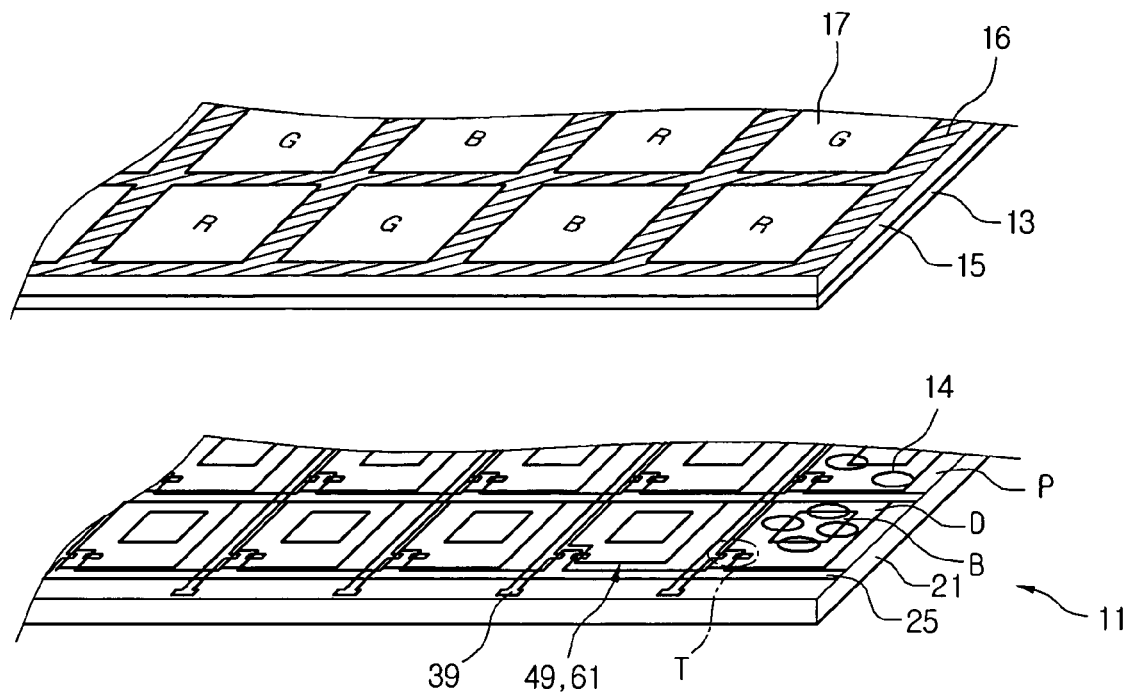
FIG. 1 is an exploded perspective view of a related art transflective type LCD.
Figure 2:
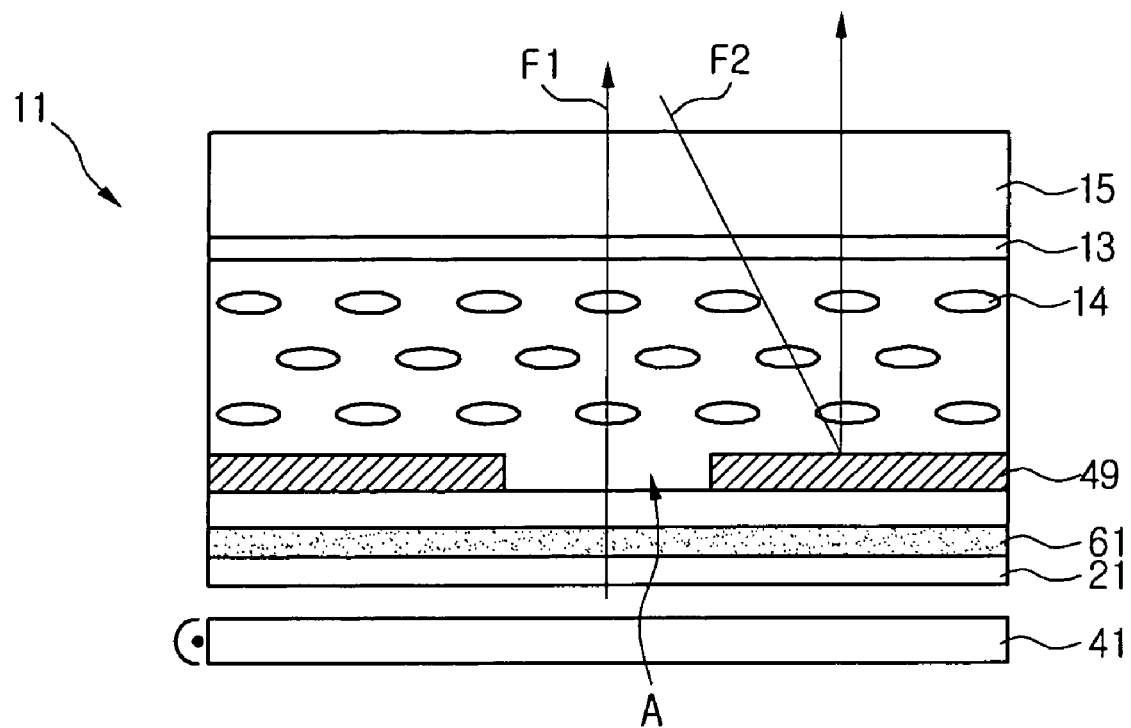
FIG. 2 is a sectional view of the related art transflective type LCD.
Figure 3:
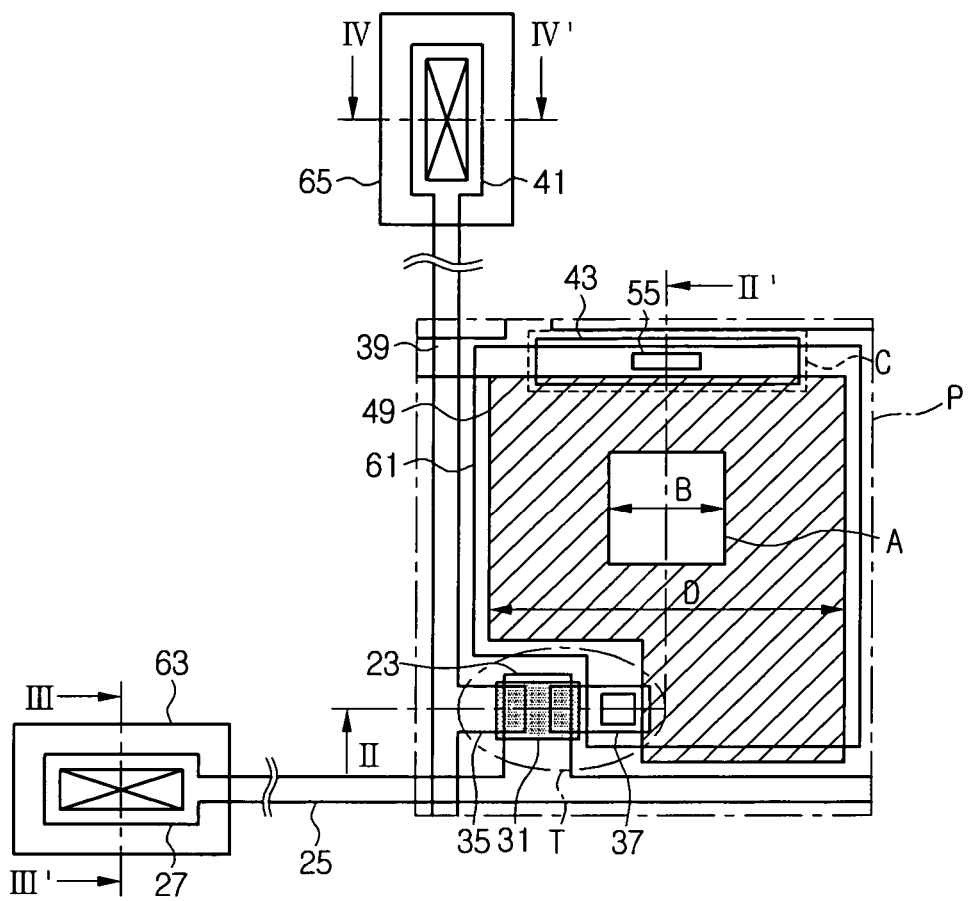
FIG. 3 is an enlarged plan view of a predetermined region of a bottom substrate in the related art transflective type LCD.
Figure 4:
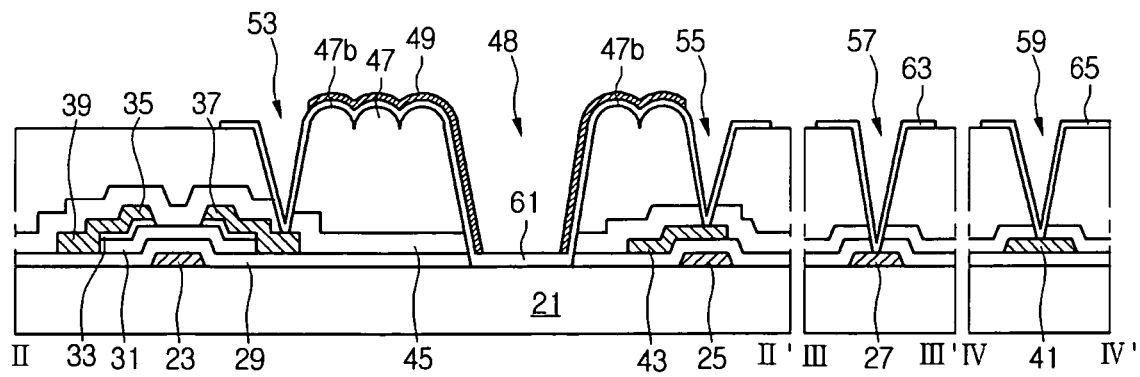
FIG. 4 is a sectional view taken along lines II-II', III-III' and IV-IV' of FIG. 3.
Figure 5:
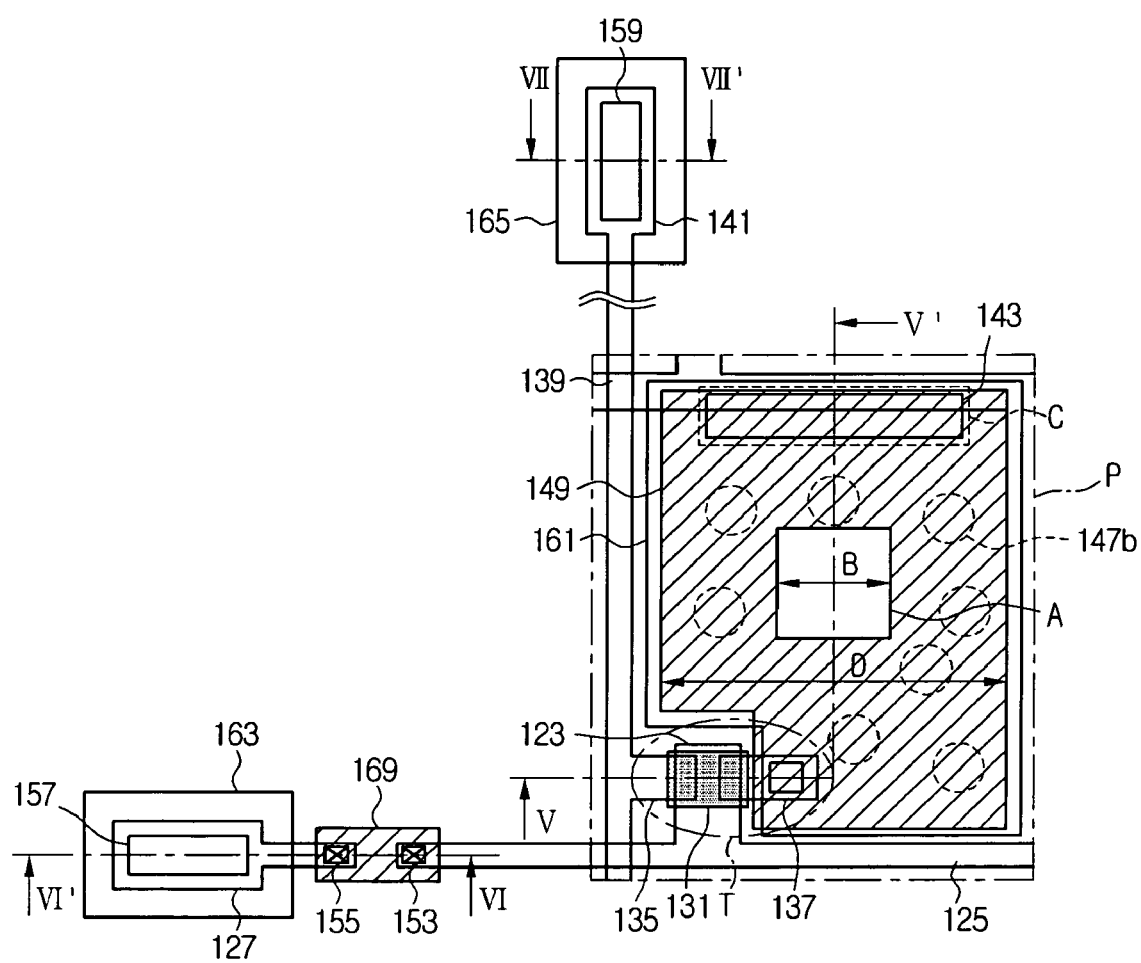
FIG. 5 is an enlarged plan view of a predetermined region of a bottom substrate in a transflective type LCD according to an embodiment of the present invention.

FIG. 5 is an enlarged plan view of a portion of a bottom substrate in a transflective type LCD according to an embodiment of the present invention.

The bottom substrate 121 is also called an array substrate. The bottom substrate 121 includes a plurality of gate lines 125, a plurality of data lines 139, thin film transistors (TFTs) T. The gate lines 125 and the data lines 139 cross one another. The TFTs T acting as a switching element are provided at crossings of the gate lines 125 and the data lines 139 . . . Pixel regions P are defined by the crossings of the gate lines 125 and the data lines 139.

A gate pad electrode 127 is formed at one end of the gate line 125 and has a larger width than that of the gate line 125.

The gate pad electrode 127 has a jumping structure in which it is electrically connected to the gate line 125 while contacting with a jumping electrode 169 through first and second jumping contact holes 153 and 155.

A data pad electrode 141 is formed at one end of the data line 139 and has a larger width than that of the data line 139.

The gate pad electrode 127 and the data pad electrode 141 electrically contact with a transparent gate pad terminal electrode 163 and a transparent data pad terminal electrode 165, respectively. The transparent data pad terminal electrode 163 and the transparent data pad terminal electrode 165 directly receive corresponding external signals.

A storage capacitor C is formed on a portion of the gate line 125.

The TFT T includes a gate electrode 123, source/drain electrodes 135 and 137, and a semiconductor layer 131 formed on the gate electrode 123.

A transparent electrode 161 and a reflective electrode 149 with a transmission hole A are formed in the pixel region P. The transparent electrode 161 and the reflective electrode 149 define a transmission region B and a reflection region D.

The drain electrode 137 contacts with the transparent electrode 161, and the transparent electrode 161 contacts with a portion of the reflective electrode 149 at a boundary of the transmission hole A. A pixel electrode is formed by the reflective electrode 149 and the transparent electrode 161.

Meanwhile, only the transparent electrode 161 is exposed at the transmission region B of the pixel region P. A protruded pattern 147b is formed in the reflection region D of the organic insulation layer 147.

The storage capacitor C includes a first capacitor electrode 143 and a second capacitor electrode. A portion of the gate line 125 is used as the first capacitor electrode 143. A metal layer 143 facing an upper portion of the gate line 125 and formed on the same layer as the drain electrode 137 is used as the second capacitor electrode.

The metal layer 143 directly contacts with the transparent electrode 161.

A method of manufacturing the bottom substrate of the transflective type LCD according to the present invention will be described below with reference to FIGS. 6A to 6D.

FIGS. 6A to 6D are sectional views taken along lines V-V', VI-VI' and VII-VII' of FIG. 5, showing sequential procedures of manufacturing the transflective type LCD according to the embodiment of the present invention.

Figure 6A:
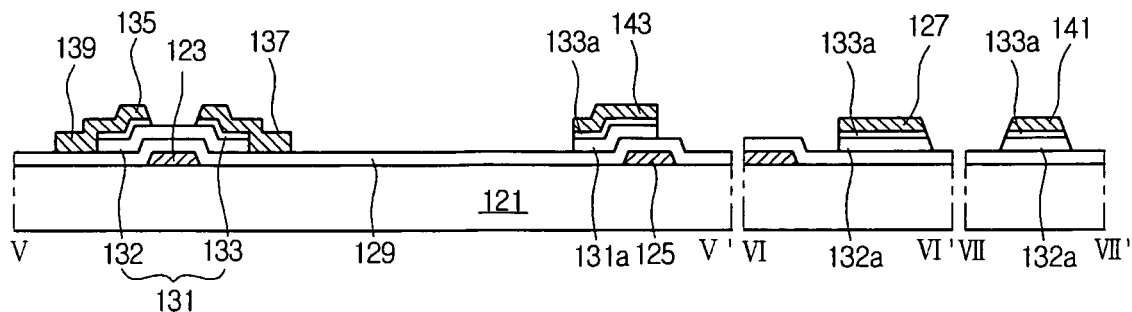
FIGS. 6A to 6D are sectional views taken along lines V-V', VI-VI' and VII-VII' of FIG. 5, showing sequential procedures of manufacturing the transflective type LCD according to the embodiment of the present invention.

Referring to FIG. 6A, a gate electrode 123 and a gate line 125 are formed on a substrate 121.

A gate insulation layer 129 as a first insulation layer is formed on the substrate 121 where the gate electrode 123 and the gate line 125 are formed.

The gate insulation layer 129 is formed by depositing an inorganic insulation material including silicon nitride (SiNx) and silicon oxide (SiO2).

A semiconductor layer 131 is formed on the gate insulation layer 129 disposed on the gate electrode 123. The semiconductor layer 131 includes an active layer 132 and an ohmic contact layer 133.

The active layer 132 is formed of pure amorphous silicon (a-Si:H) and the ohmic contact layer 133 is formed of an impurity-containing amorphous silicon (n+a-Si:H).

A photoresist is coated on the substrate 121, and a half-tone mask is disposed and exposed to light. The half-tone mask has a shielding region, a transmission region, and a transflective region. The transflective region is generally made by a plurality of slits.

The transflective region of the mask corresponds to a channel region. The active layer 132 is exposed by removing the ohmic contact layer 133 disposed on the gate electrode 123.

Accordingly, the active layer 132 and the ohmic contact layer 133 are formed in an island shape on the gate insulation layer 129 disposed on the gate electrode 123.

A metal material is coated on the substrate and patterned to form source/drain electrodes 135 and 137 contacting with the ohmic contact layer 133, a data line 139 connected to the source electrode 135, a data pad electrode 141 connected to one end of the data line 139, and a gate pad electrode 127 connected to one end of the gate line. That is, the gate pad electrode 127 and the data line 139 are formed of the same material on the same layer.

At the same time, an island-shaped metal layer 143 is formed on a portion of the gate line 125 defining the pixel region P.

The metal material may include chrome (Cr), molybdenum (Mo), titanium (Ti), tungsten (W), aluminum (Al), or aluminum alloy.

An active layer pattern 132a and an ohmic contact layer pattern 133a are formed under the data line 139, the data pad electrode 141, the gate pad electrode 127, and the metal layer 143.

Figure 6B:
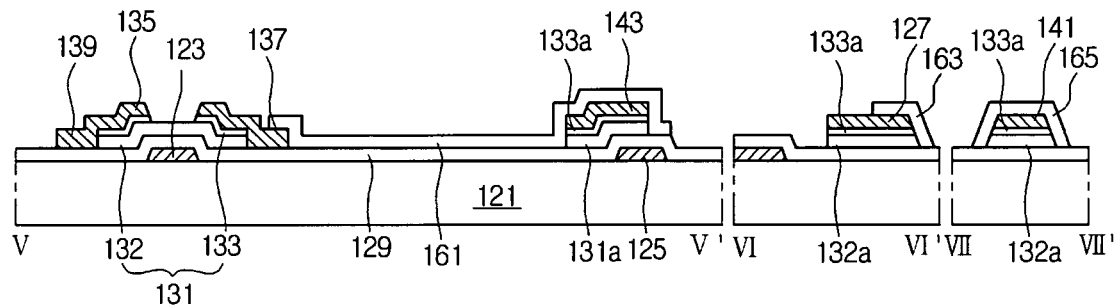

Referring to FIG. 6B, a transparent metal including indium tin oxide (ITO) and indium zinc oxide (IZO) is deposited and patterned to form a transparent electrode 161.

The transparent electrode 161 is formed in an area from the drain electrode 137 to the metal layer 143, and is electrically connected to the drain electrode 137 and the metal layer 143. The metal layer 143 is fully covered with the transparent electrode 161.

In addition, a gate pad terminal electrode 163 contacting with the gate pad electrode 127, and a data pad terminal electrode 165 contacting with the data pad electrode 141 are formed using the transparent conductive metal.

By forming the gate pad terminal electrode 163 and the data pad terminal electrode 165 on the gate pad electrode 127 and the data pad electrode 141 using the transparent conductive metal, it is possible to prevent failure from occurring in subsequent processes due to pad electrochemical corrosion and erosion.

Figure 6C:
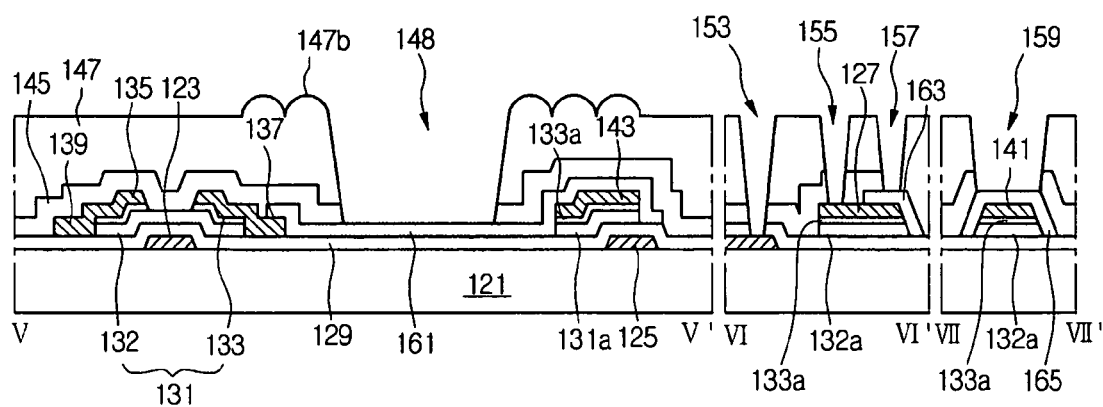

Referring to FIG. 6C, a protection layer 145 as a second insulation layer is formed on the substrate 121 over the transparent electrode 161.

The protection layer 145 is a silicon insulation layer formed by depositing silicon nitride (SiNx) or silicon oxide (SiO2).

Because the silicon insulation layer has good interface characteristic with the active layer 132, no trap potential that traps electrons exists in the interface.

Therefore, mobility of carriers flowing through the active layer 132 can be enhanced.

A photosensitive organic insulation material including benzo-cyclo-butene (BCB) and photoacryl-based resin is coated on the protection layer 145 to form an organic insulation layer 147 as a third insulation layer.

A protruded pattern 147b is formed in the reflection region D of the organic insulation layer 147.

Specifically, a photolithography process is carried out to irradiate light on the photosensitive organic insulation layer through a mask formed on the organic insulation layer 147. Then, a photosensitive organic pattern is formed in the reflection region D having rectangular protrusions on the surface.

It can be seen that the photosensitive organic insulation layer 147 is also removed which corresponds to the transmission region B of the bottom substrate. At this point, the photosensitive organic insulation layer 147 is also removed which corresponds to the remaining region of the substrate 121 except for the transmission region B and the reflection region D.

Then, a fusing and curing process is carried out on the rectangular protrusions to form a round embossed-protrusion pattern 147b with a top surface in the reflection region D.

Meanwhile, the protrusion pattern can be formed using various methods.

The organic insulation layer 147 and the protection layer 145 are etched to form an etch groove 148 exposing a portion of the pixel region P, a gate pad contact hole 157 exposing a portion of the gate pad terminal electrode 163 disposed of the gate pad electrode 127, and a data pad contact hole 159 exposing a portion of the data pad terminal electrode 165 disposed on the data pad electrode 141.

A first jumping contact hole 153 exposing a portion of one end of the gate line 125, and a second jumping contact hole 155 exposing a portion of the gate pad electrode 127 are formed.

The formation of the plurality of contact holes 153, 155, 157, and 159 and the formation of the embossed pattern in the organic insulation layer 147 are carried out by one mask process.

Figure 6D:
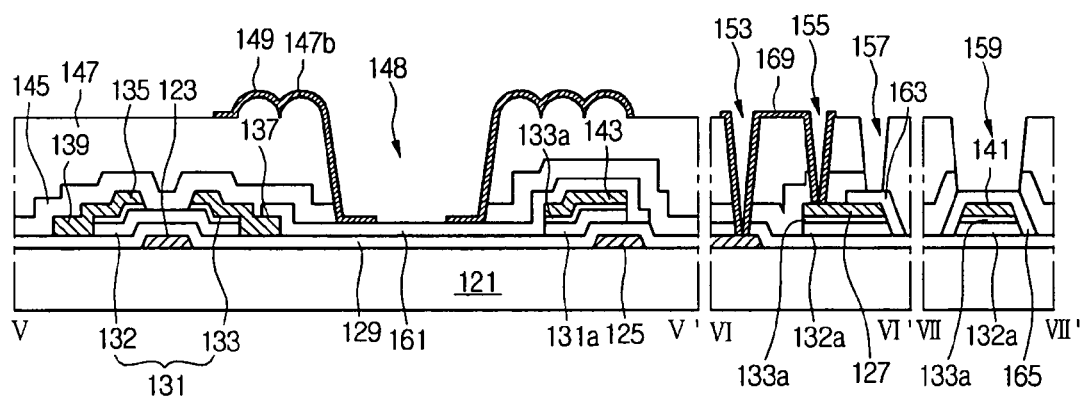

Referring to FIG. 6D, a metal, such as aluminum or aluminum alloy, having an excellent reflectivity is deposited on the plurality of contact holes 153, 155, 157 and 159 and is patterned to form a reflective electrode 149 with a transmission hole A at a region corresponding to the etch groove 148. That is, the reflective electrode 149 is not formed at the transmission hole A. Accordingly, while light passes through the transmission hole A, light does not pass through the reflection region D but is reflected by the reflective electrode 149.

The reflective electrode 149 has a protruded structure due to the organic insulation layer 161 with the protrusion pattern 147b formed on the reflection region D.

The reflective electrode 149 contacts with the transparent electrode 161 at the boundary of the reflection region D and the transmission region B.

Therefore, a pixel signal inputted through the drain electrode 137 is transferred to the transparent electrode and is applied to the reflective electrode. Thus, the reflective electrode 149 and the transparent electrode 161 form one pixel electrode.

Also, using material such as aluminum and aluminum alloy, a jumping electrode 169 is formed to connect one end of the gate line 125 to the gate pad electrode 127 through the first and second jumping contact holes 153 and 155. Accordingly, the reflective electrode and the jumping electrode are formed on the same layer using the same material at the same time.

The mask processes can be reduced by forming the transparent electrode prior to the formation of the protection layer and the protrusion pattern. Consequently, the manufacturing cost can be reduced and the manufacturing yield can be enhanced.

According to the present invention, the respective edge portions of the transparent electrode, the gate pad terminal electrode, the data pad terminal electrode is not exposed to the outside. Therefore, when the etching process of forming the reflective electrode is carried out, an etching solution does not penetrate the transparent electrode. Consequently, liftoff of the transparent electrode can be prevented, reducing the product failure and enhancing the reliability of product.

It will be apparent to those skilled in the art that various modifications and variations can be made in the present invention. Thus, it is intended that the present invention covers the modifications and variations of this invention provided they come within the scope of the appended claims and their equivalent.

What is claimed is:

1. A transflective LCD (liquid crystal display device) comprising:
   a substrate in which a pixel region having a reflection region and a transmission region are defined;
   a gate line formed on the substrate;
   a first insulation layer formed on the substrate including the gate line;
   a TFT (thin film transistor) formed on the substrate;
   a data line crossing the gate line;
   a storage electrode formed on the first insulation layer and overlapping with the gate line;

a transparent electrode formed on the first insulation layer in the pixel region and connected to a drain electrode of the TFT and the storage electrode, the transparent electrode being formed to contact the drain electrode of the TFT, the first insulation layer and the storage electrode;
a second insulation layer formed on the substrate including the TFT and the transparent electrode, the second insulation layer not being formed in the transmission region;
a third insulation layer formed on the second insulation layer with a protrusion pattern formed in the reflection region;
first and second pad electrodes formed at one end of the gate line and the data line, respectively;
a reflective electrode formed on the third insulation layer in the reflection region, the reflective electrode being connected to an upper surface of the transparent electrode at a boundary region between the reflection region and the transmission region and through the second and third insulation layers; and
a jumping electrode formed of the same material as the reflective electrode and connecting between the gate line through a first contact hole and the first pad electrode through a second contact hole, the jumping electrode and the first pad electrode being formed on different layers,
wherein the first contact hole is formed passing through the first to third insulation layers, and the second contact hole is formed passing through the second and third insulation layers,
wherein the reflective electrode does not fully overlap the gate line, the data line and the TFT, and
wherein an active layer pattern and an ohmic contact layer pattern are formed under the data line, the first pad electrode, the second pad electrode, and the storage electrode.

2. The transflective LCD according to claim 1, wherein the gate line and the first pad electrode are formed on different layers.

3. The transflective LCD according to claim 1, wherein the first and second pad electrodes are formed on the same layer as the data line.

4. The transflective LCD according to claim 1, wherein the jumping electrode and the reflective electrode are formed of the same layer.

5. The transflective LCD according to claim 1, further including first and second pad terminal electrodes on the first and second pad electrodes,
wherein the first and second pad terminal electrodes directly contact the first and second pad electrodes.

6. The transflective LCD according to claim 5, wherein the first and second pad terminal electrodes and the transparent layer are formed from the same layer.

7. The transflective LCD according to claim 1, wherein the third insulation layer is formed of a photosensitive organic insulation layer.

8. The transflective LCD according to claim 1, further including a storage capacitor between the gate line and the storage electrode.

9. The transflective LCD according to claim 1, wherein the storage electrode and the data line are formed on the same layer.

10. The transflective LCD according to claim 1, wherein the transparent electrode is formed of a transparent conductive material.

11. A method of manufacturing a transflective LCD, comprising:

providing a substrate in which a pixel region having a reflection region and a transmission region are defined;
forming a gate line and a gate electrode on the substrate;
forming a first insulation layer on the substrate on which the gate line is formed;
forming a semiconductor layer on the first insulation layer disposed on the gate electrode;
forming source/drain electrodes contacting with the semiconductor layer, a data line connected to the source electrode and crossing the gate line, a storage electrode on the first insulation layer corresponding to the gate line, and first and second pad electrodes at one end of the gate line and one end of the data line, respectively;
forming a transparent electrode on the first insulation layer between the drain electrode and the storage electrode, the transparent electrode being formed to contact the drain electrode, the first insulation layer and the storage electrode, and first and second pad terminal electrodes electrically connected to the first and second pad electrodes, respectively;
forming a second insulation layer on the substrate including the TFT and the transparent electrode, the second insulation layer not being formed in the transmission region;
forming a third insulation layer formed on the second insulation layer with a protrusion pattern in the reflection region; and
forming a reflective electrode on the third insulation layer in the reflection region, the reflective electrode being connected to an upper surface of the transparent electrode at a boundary region between the reflection region and the transmission region and through the second and third insulation layers, and a jumping electrode formed of the same material as the reflective electrode and connecting between the gate line through a first contact jumping hole passing through the first to third insulation layers and the first pad electrode through a second contact jumping hole passing through the second and third insulation layers, the jumping electrode and the first pad electrode being formed on different layers,
wherein a TFT (thin film transistor) includes the gate electrode, the semiconductor layer and the source/drain electrodes; and
wherein the reflective electrode does not fully overlap the gate line, the data line and the TFT, and
wherein an active layer pattern and an ohmic contact layer pattern are formed under the data line, the first pad electrode, the second pad electrode, and the storage electrode.

12. The method according to claim 11, further including forming a transmission hole in the transmission region, first and second pad terminal contact holes exposing the first and second pad terminal electrodes, respectively, and first and second jumping contact holes exposing the gate line and the first pad electrode, respectively,
wherein the first pad electrode is spaced apart from the gate line;
wherein the first contact jumping hole is formed passing through the first to third insulation layers, and the second contact jumping hole is formed passing through the second and third insulation layers; and
wherein the first and second pad terminal electrodes directly contact the first and second pad electrodes.

13. The method according to claim 12, wherein the gate line and the first pad electrode are electrically connected together through the first and second jumping contact holes.

14. The method according to claim 12, further including removing the second and third insulation layers from the transmission region.

15. The method according to claim 11, wherein the third insulation layer is formed of a photosensitive organic insulation layer.

16. The method according to claim 11, wherein a storage capacitor is formed between the gate line and the storage electrode.

17. The method according to claim 11, wherein the transparent electrode is electrically connected to the drain electrode and the storage electrode.

18. The method according to claim 11, wherein the transparent electrode is formed of a transparent conductive material.

19. The method according to claim 11, wherein the reflective electrode is electrically connected to the transparent electrode in the transmission region.

20. The method according to claim 11, wherein the transparent electrode is formed under the second insulation layer and the reflective electrode is formed above the third insulation layer in the reflection region.

* * * * *